US009026378B2

(12) United States Patent
Fericean et al.

(10) Patent No.: US 9,026,378 B2
(45) Date of Patent: May 5, 2015

(54) DEVICE FOR DETECTING THE TWIST ANGLE OF A SHAFT AND/OR A TORQUE OCCURRING ON THE SHAFT AND METHODS FOR OPERATING THE DEVICE

(75) Inventors: Sorin Fericean, Leonberg (DE); Andrea Hiller-Brod, Weilheim (DE); Reinhard Droxler, Eningen (DE); Markus Fritton, Neuhausen (DE); Daniel Kraeter, Sulzfeld (DE)

(73) Assignee: Balluff GmbH, Neuhausen/Filder (DE)

( * ) Notice: Subject to any disclaimer, the term of this patent is extended or adjusted under 35 U.S.C. 154(b) by 719 days.

(21) Appl. No.: 13/136,817

(22) Filed: Aug. 11, 2011

(65) Prior Publication Data
US 2012/0041691 A1 Feb. 16, 2012

(30) Foreign Application Priority Data

Aug. 13, 2010 (EP) .................................... 10008468

(51) Int. Cl.
| | | |
|---|---|---|
| *G01L 3/00* | (2006.01) | |
| *G01D 5/20* | (2006.01) | |
| *G01L 3/10* | (2006.01) | |
| *G01L 25/00* | (2006.01) | |
| *G01D 5/347* | (2006.01) | |

(52) U.S. Cl.
CPC ................ *G01D 5/202* (2013.01); *G01L 3/109* (2013.01); *G01L 25/003* (2013.01); *G01D 5/3473* (2013.01); *G01L 3/105* (2013.01)

(58) Field of Classification Search
CPC ........ G01D 5/002; G01D 5/3473; G01L 3/04; G01L 3/10; G01L 3/109; G01L 25/003; G01P 3/44; G01P 3/487
See application file for complete search history.

(56) References Cited

U.S. PATENT DOCUMENTS 4,712,432 A * 12/1987 Hochstein et al. ....... 73/862.334
5,321,985 A * 6/1994 Kashiwagi et al. ...... 73/862.335
(Continued)

FOREIGN PATENT DOCUMENTS

| DE | 198 18 799 | 6/1999 |
| DE | 199 32 965 | 1/2001 |

(Continued)

OTHER PUBLICATIONS

European Office Action dated May 27, 2014 in European Patent Application No. 10 008 468.0-1558 with English translation of relevant parts.

(Continued)

*Primary Examiner* — John Breene
*Assistant Examiner* — Timothy H Hwang
(74) *Attorney, Agent, or Firm* — Collard & Roe, P.C.

(57) ABSTRACT

A device for detecting a twist angle and/or a torque of a shaft occurring on the shaft and methods for operating the device uses at least one first encoder and at least one second encoder at a predefined spacing therefrom. Each encoder influences at least one coil parameter, is associated with at least a part of the circumference of the shaft, and has at least one track having at least one period per revolution of the shaft. At least first and second inductive sensors scan the first and second encoders, respectively. Each inductive sensor provides a respective sensor signal reflecting at least one measure for the rotational angle of the shaft within the period, and a difference ascertainment unit ascertains and provides the twist angle of the shaft as an angle difference of the two rotational angles detected by the inductive sensors.

13 Claims, 11 Drawing Sheets

(56) References Cited

U.S. PATENT DOCUMENTS

| | | | |
|---|---|---|---|
| 6,260,421 B1 | 7/2001 | Torbjörnsson et al. | |
| 6,564,654 B2 | 5/2003 | Madni et al. | |
| 6,761,075 B2 | 7/2004 | Steinlechner et al. | |
| 6,772,646 B1 | 8/2004 | Madni et al. | |
| 2005/0150712 A1* | 7/2005 | Tokumoto | 180/443 |
| 2006/0144166 A1* | 7/2006 | Ruehl et al. | 73/862.331 |
| 2009/0217774 A1* | 9/2009 | Sills et al. | 73/862.193 |
| 2010/0001718 A1* | 1/2010 | Howard et al. | 324/207.15 |
| 2010/0156402 A1* | 6/2010 | Straubinger et al. | 324/207.25 |

FOREIGN PATENT DOCUMENTS

| | | |
|---|---|---|
| DE | 602 01 226 | 3/2005 |
| DE | 697 32 355 | 1/2006 |
| DE | 10 2007 023 537 | 11/2008 |
| DE | 10 2008 027 719 A1 | 12/2009 |
| EP | 1 315 954 | 6/2003 |

OTHER PUBLICATIONS

"Inductive distance sensor," http://www.balluff.com/balluff/MUS/en/products/catalogue/products_details.jsp?id=BA, retrieved on Jun. 20, 2014, total of 2 pages.

Jagiella, M. et al., "Progress and Recent Realizations of Miniaturized Inductive Proximity Sensors for Automation," IEEE Sensors Journal, vol. 6, No. 6, Dec. 2006, pp. 1734-1741.

Jaiella, M. et al., "59.1: Miniaturized Inductive Sensors for Industrial Applications," IEEE, 2002, pp. 771-778.

Chinese Office Action in CN 201110290013.3, dated Oct. 28, 2014.

\* cited by examiner

DEVICE FOR DETECTING THE TWIST ANGLE OF A SHAFT AND/OR A TORQUE OCCURRING ON THE SHAFT AND METHODS FOR OPERATING THE DEVICE

CROSS REFERENCE TO RELATED APPLICATIONS

Applicants claim priority under 35 U.S.C. §119 of European Application No. 10008468.0 filed Aug. 13, 2010, the disclosure of which is incorporated by reference.

The invention is directed to a device for detecting the twist angle of a shaft and/or a torque occurring on the shaft as well as methods for operating the device.

The object of the present invention is also a computer program for operating the device.

PRIOR ART

A device for detecting the rotational angle of a shaft is described in patent specification DE 198 18 799 C2. The device contains a magnetic gauge and a sensor unit associated with the gauge. The magnetic gauge has two magnetically coded rings coaxially situated on the rotational axis. The number of magnetic poles on half the circumference of one ring is relatively prime to the number of magnetic poles on half the circumference of the other ring. Furthermore, one ring has an odd number of poles. The sensor configuration contains two magnetoresistive sensors, which detect the magnetic field of the two rings, and a further sensor implemented as a Hall sensor, which detects the magnetic field of the ring having the odd number of poles.

A position measuring device is described in published application DE 199 32 965 A1, using which the torque occurring on a shaft is ascertained. The optical sensor comprises a scale unit having a first double scale made of a first division scale and a second division scale situated in the circumferential direction of the shaft. The superposition of both division scales generates an optically detectable moiré pattern as a function of the torque. An optical sensor detects a subsection of the moiré pattern, which is converted in an analysis unit into an image of a period of the moiré pattern, with which the zero point of the torque is associated when the shaft is stationary.

A capacitive measuring device is described in patent specification DE 602 01 226 T2, using which the torque occurring on a two-part shaft connected to a torsion bar is measured. A dielectric disc is provided, which has a plurality of spokes and is installed for rotation with the first half of the shaft. Furthermore, a pair formed from a first conductive disc and a second conductive disc provided with openings is present, which encloses the dielectric disc like a cage and is installed for rotation with half of the shaft, the cage covering sections of the spokes of the dielectric disc in relation to an exerted torque of the shaft. Furthermore, a pair of concentric capacitor plate rings is provided, which are situated in a first conductive disc, which is provided with openings, to enclose the first shaft half. Furthermore, an opposing capacitor plate is provided, which encloses the second shaft half and is situated adjacent to the second conductive disc provided with openings. Furthermore, electrical bridge means are provided for equalizing the capacitances formed between the pair of concentric rings and the opposing capacitor plate, in order to finally determine the torque occurring on the shaft.

A method for installing a torque sensor in engines or transmissions is described in patent specification DE 697 32 355 T2, the torque sensor being installed essentially concentrically in connection with a rotating shaft. The torque sensor comprises at least one stationary coil and has at least one zone, which is equipped with parallel conduction paths made of conductive material. The rotating shaft is implemented as a crankshaft, which has a recess, the zone being situated on an external lateral surface of a measuring surface, which is fastened in the recess and is enclosed by the stationary coil. The known configuration is distinguished in that the measuring shaft and the recess are each provided with an opening and jointly receive a bolt or a screw running through these openings, in order to fasten or lock the recess and the measuring shaft.

A device for measuring strains is described in published application DE 10 2007 023 537 A1, which is particularly also suitable for measuring torque. Terminals, via which the torques are conducted in or out, are connected to one another via strain measuring structures, which have measuring transducers. The device is implemented as a ring flange, which is divided into segments, which are connected to one another by the strain measuring structures.

A method for ascertaining the angle difference on a divided shaft having phase tracks and an interconnected torsion bar is known from patent specification EP 1 315 954 B1, ambiguous phase signals first being obtained in each case using assigned optical sensors and an analysis unit in relation to a revolution of the shaft. The known method is distinguished in that at least two phase signals are added together in a weighted manner to form a signal, a non-integer component is formed by the signal, the component being proportional to the angle difference, and the torque applied to the shaft is determined from the angle difference by multiplication with the spring constant of the interconnected torsion bar.

Inductive sensors which are used in the present patent application are described in the Internet under the link leading to the applicant: http://www.balluff.com. The inductive sensors provide an analog signal, which is proportional to the spacing in relation to an encoder within the specified operating range.

The invention is based on the object of specifying a device and various methods for operating the device, which allow reliable ascertainment of the twist angle of a shaft and/or a torque occurring on the shaft, in particular in rough environmental conditions, as occur in transmissions, for example.

The object is achieved by the features specified in accordance with the invention.

SUMMARY OF THE INVENTION

The device according to the invention for detecting the twist angle of a shaft is distinguished in that at least one first encoder is associated with the shaft, which has at least one coil parameter, at least one first inductive sensor is provided for scanning the first encoder, the at least one first encoder is associated with at least a part of the circumference of the shaft, the at least one first encoder has at least one track having at least one period per revolution of the shaft, and the at least one first inductive sensor provides a sensor signal which reflects at least one measure of the rotational angle of the shaft within the period, a second encoder, which is also associated with at least one part of the circumference of the shaft, is provided at a predefined spacing to the first encoder, the second encoder also influencing at least one coil parameter, at least one inductive sensor is provided for scanning the at least one second encoder, the at least one second encoder also has at least one track having at least one period per revolution of the shaft, the second inductive sensor also provides a sensor signal, which reflects at least one measure of the rotational angle of the shaft within the period, and a difference ascertainment unit is provided which ascertains and provides the twist angle of the shaft as the angle difference of the two rotational angles detected by the inductive sensors.

The device according to the invention for detecting the twist angle of a shaft allows a continuous measurement of the twist angle. The device according to the invention has a high reliability, even in particularly adverse environmental conditions. Soiling of both the encoder and also the sensor do not influence the precision. The device according to the invention has a compact construction and can be implemented without a substantial engagement in the structure of the shaft.

A difference ascertainment unit is provided, which ascertains and provides the difference of the two rotational angles detected by the inductive sensors. The angle difference corresponds to the twist angle of the shaft, which occurs because of a torque acting on the shaft. Therefore, the device according to the invention allows the ascertainment of a measure for the torque.

Because of the comparatively low costs, the device according to the invention for detecting the twist angle of a shaft and/or a torque occurring on the shaft is particularly suitable for mass production.

Advantageous refinements and embodiments of the procedure according to the invention are discussed below.

One advantageous embodiment provides that the at least one track of the first and/or second encoder only contains a single period, the track winds at least partially around the shaft in the form of a spiral, for example, in the form of a helix with a predefined pitch in the longitudinal direction of the shaft. The advantage thus results that an unambiguous relationship between the rotational angle of the shaft and the sensor signal is always provided.

A refinement of this embodiment provides that the pitch of the spiral in helix form, for example, is at least approximately consistent in the longitudinal direction of the shaft. A linear relationship between the rotational angle of the shaft and the sensor signal is thus at least approximately achieved. Another refinement of this embodiment provides that the pitch is established such that the at least one spiral extends at least once completely around the shaft. The twist angle can thus be unambiguously detected in the range from 0° to 360°.

According to another embodiment, it is provided that the at least one track of the first and/or second encoder only contains one period, and the track winds at least partially around the shaft having a predefined pitch in the longitudinal direction of the shaft in ellipsoid form. The at least one track preferably encloses the shaft completely, so that a closed ellipsoid form occurs. The twist angle can thus be unambiguously detected either in the range from 0° to 180° or in the range from 180° to 360°.

One embodiment provides the implementation of the track as a groove in the shaft. However, the track is preferably implemented as a web on the shaft. The web can thus be implemented as a separate part, for example, as a strip, for subsequent application to the shaft. Using this embodiment, in addition to the advantage of possible retrofitting, the further substantial advantage is achieved that the structure of the shaft remains untouched.

Another embodiment provides that two track sensors are associated with at least one track. The two track sensors of an encoder are preferably situated offset to one another by an angle of at least approximately 90° in relation to the circumference of the shaft. A plausibility check of the sensor signals or a mean value calculation can thus be performed, for example.

A refinement provides that the track of the first encoder is wound mirror-inverted in relation to the track of the second encoder with respect to the longitudinal direction of the shaft. Common mode interference can thus be suppressed and/or compensated for.

Another embodiment provides that the track of the first and/or second encoder extends without pitch, only in the circumferential direction of the shaft. The encoder can wrap completely around the shaft or can only be associated with a part of the circumference of the shaft.

Refinements of this embodiment provide that the period of the at least one track of the first and/or second encoder is implemented as a web or groove having modulated width and/or height. Furthermore, it can be provided that the period of the at least one track of the first and/or second encoder is implemented as a web having sinusoidally modulated width or as a web having at least sectionally sinusoidally modulated width or as cams or as recesses.

One embodiment of this refinement provides that the at least one track of the at least one encoder contains a plurality of repeating periods. Using this embodiment, the resolution of the sensor signal with respect to the circumference of the shaft is substantially increased, an unambiguous detection of the rotational angle of the shaft within one of the repeating periods being provided.

Another refinement of this embodiment provides that a first inductive track sensor and a second inductive track sensor are associated with one track, which are positioned in relation to the periods of the track such that one inductive track sensor provides a sensor signal phase-shifted by at least approximately 90° in relation to the other inductive track sensor.

Using a method according to the invention for operating this embodiment of the device, a common mode interfering influence on the signal level of the two individual sensors can be eliminated using division of the two signals. A measure for the rotational angle of the shaft within a period then results from the arc tangent function.

A particularly advantageous refinement of this embodiment, in which the track has a period repeating multiple times, provides that the at least one encoder contains a further, directly adjacent track. The first track has a predefined number, greater than one, of repeating periods. The second track also has a predefined number of repeating periods, this number deviating by one or a multiple thereof from the number of periods of the first track, however. Using this embodiment, the ambiguity because of the multiple periods with respect to the periphery of the shaft is eliminated. An unambiguous result in the ascertainment of the rotational angle of the shaft is achieved using an evaluation of the angle difference between the two periods, which is characteristic for each period pair. The decisive period of a track which is used for the angle detection can thus be identified and unambiguity can be produced.

In this above-described embodiment, a first inductive track sensor and a second inductive track sensor is preferably also associated with each of the tracks situated directly adjacent, the track sensors each being positioned in relation to the period or the periods of their track such that one inductive track sensor provides a track sensor signal which is phase-shifted by at least approximately 90° in relation to the other inductive track sensor.

A common mode interfering influence on the signal level of the two individual sensors can also preferably be eliminated here using a method according to the invention for operating this embodiment of the device using a division of the two signals. A measure for the rotational angle of the shaft within one period then again results from the arc tangent function.

The essential method according to the invention for operating the device allows the ascertainment of a twist angle difference, which corresponds to a twist angle of the shaft in relation to the spacing of the two encoders. The possibly occurring twist angle corresponds to a torque acting on the shaft. Through the use of the device according to the invention, an extremely reliable detection of the torque of a shaft is possible even in the event of particularly adverse environmental conditions.

A preferred use of the device according to the invention for detecting a twist angle or a measure which can be ascertained therefrom for the torque acting on the shaft is provided in large transmissions for this reason, for example, which can possibly be subjected to a particular degree to weather and/or enormous mechanical stresses. An advantage over magnetic encoders is that, for example, metal chips do not adhere to the encoder and the encoder is durable, because demagnetization is dispensed with.

Furthermore, a computer program according to the invention for operating the device for detecting the twist angle of a shaft and/or a torque occurring on the shaft is provided. The computer program executes all required steps for ascertaining the twist angle of a shaft and/or a torque occurring on the shaft, when the computer program runs in a computer of a signal-processing configuration.

Exemplary embodiments of the invention are shown in the drawing and explained in greater detail in the following description.

DETAILED DESCRIPTION OF THE EXEMPLARY EMBODIMENTS

Figure 1:
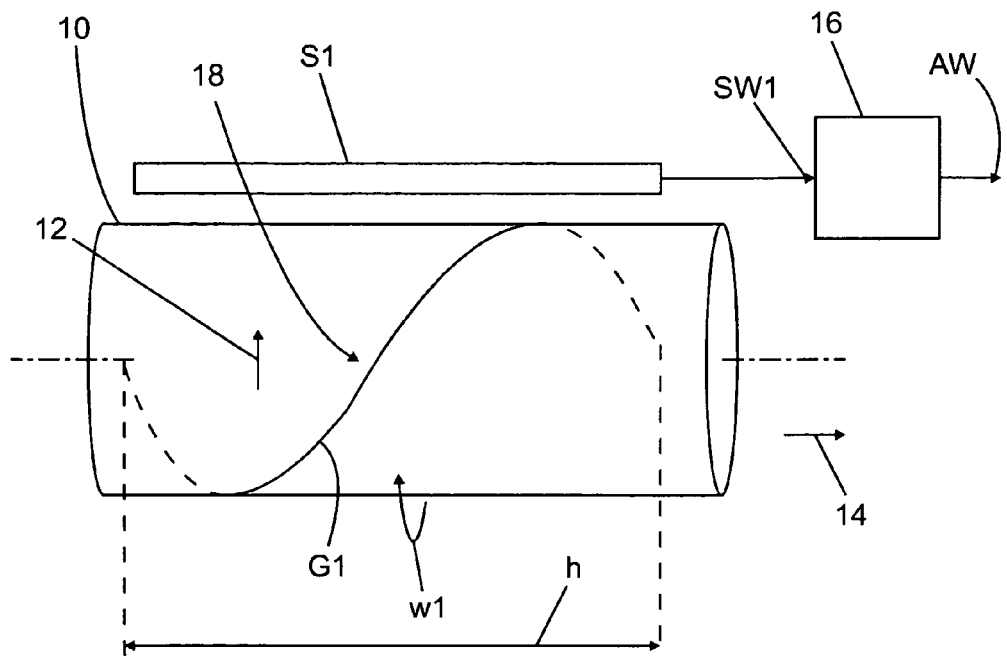
FIG. 1 shows a shaft, with which an encoder is associated, which is scanned by a sensor.

FIG. 1 shows a shaft 10 or at least a section of a shaft 10, with which an encoder G1 is associated, which is scanned by a position sensor S1, which is referred to hereafter as the position sensor S1. The encoder G1 has a track 18, which winds in the circumferential direction 12 of the shaft 10 around the shaft 10, preferably in the form of a helix or a spiral. In the exemplary embodiment shown, it is presumed the encoder G1 wraps around completely. The wraparound can also extend over only a part of the circumference of the shaft 10. The track 18 therefore has at least one period per revolution of the shaft 10, precisely one period being shown in the exemplary embodiment shown. No repetition of the period is therefore provided in the exemplary embodiment shown. The encoder G1 extends over a specific pitch h in the longitudinal direction 14 of the shaft 10.

The encoder G1 is implemented such that it influences at least one coil parameter. This is to mean that the encoder G1 influences an electrical parameter, such as the quality of an oscillating circuit, when it is scanned by an inductive sensor, which is offered by the applicant, for example, under the citation specified at the beginning.

The position sensor S1 which scans the encoder G1 is correspondingly such an inductive sensor, whose sensor signal SW1 reflects the part of the track 18 of the encoder G1 closest to the position sensor S1 in a position-sensitive manner.

Because of the association of the track of the encoder G1 with a position within the pitch h, the sensor signal SW1 therefore reflects a measure for the rotational angle w1 of the shaft 10. The rotational angle w1 can similarly be referred to as a position of the shaft 10 in relation to the circumferential direction 12 of the shaft 10. However, reference is only made hereafter to the rotational angle w1 of the shaft 10.

The track of the encoder G1 can be implemented as a groove in the shaft 10. However, an implementation as a web is preferably provided. No intervention is thus required in the structure of the shaft 10. The web can be applied subsequently to the shaft 10.

The sensor signal SW1 is provided to a signal-processing configuration 16, which converts the sensor signal SW1, which is normally provided in analog form, into an output signal AW, which is at least one measure for the rotational angle w1 of the shaft 10. The rotational angle w1 in degrees is proportional to the product of the sensor signal SW1 in volts, which is a function of the position or the deflection, and the wrap-around angle of the encoder G1 (for example, 360°) and is inversely proportional to the product of the pitch h (helix pitch) in millimeters and the slope b of the sensor signal SW1 in V/mm.

$$w1 = \frac{SW1}{h \cdot b} * \frac{360°}{2\pi} \qquad (1)$$

Figure 2:
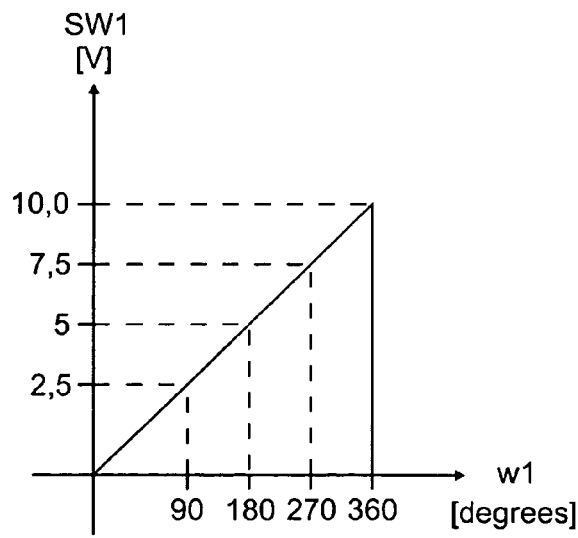
FIG. 2 shows a functional relationship between a rotational angle of the shaft and an output signal of the sensor, FIG. 3 also shows a shaft with which an encoder is associated, which is also scanned by a sensor.

The functional relationship between the rotational angle w1 of the shaft 10 and the sensor signal SW1 is shown in FIG. 2.

The exemplary track 18 of the encoder G1, which is shown in FIG. 1 and is implemented in the form of a spiral, results in an at least approximately linear relationship between the output signal AW and the rotational angle w1. Therefore, in this exemplary embodiment, a specific value of the sensor signal SW1 is uniquely associated with each angle w1 of the shaft 10.

In the exemplary embodiment shown, it is presumed that the voltage of the sensor signal SW1 of the position sensor S1 is to be between 0 V and 10 V, which can be uniquely associated with a position of the track of the encoder G1 within the pitch h and thus can be uniquely associated with a specific rotational angle w1 of the shaft 10. After reaching the rotational angle 360°, the sensor signal SW1 jumps back to zero.

Figure 3:
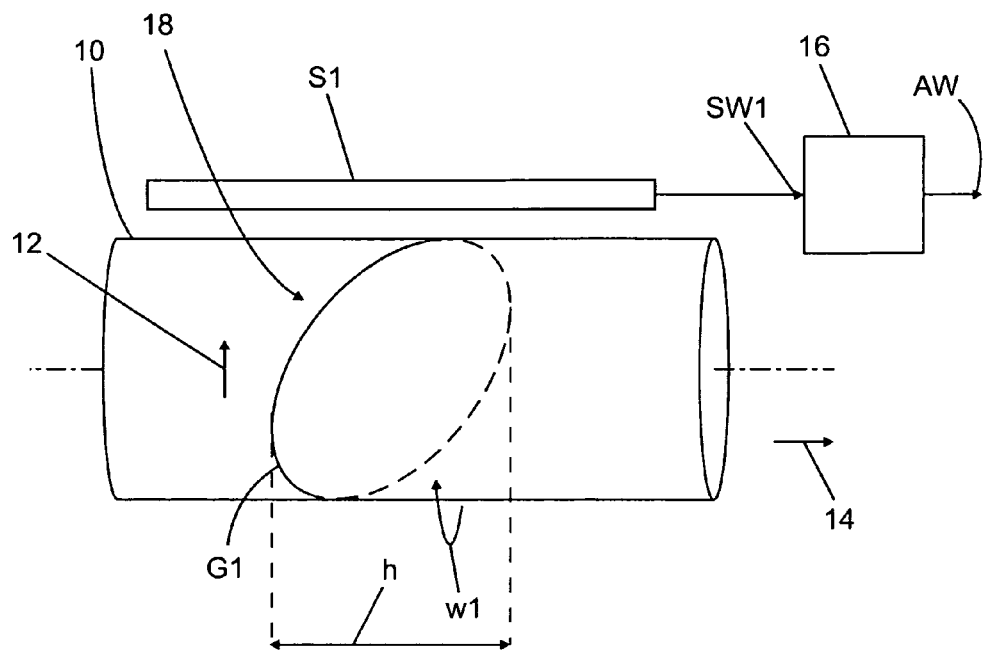

Instead of the helix or spiral form of the track 18 of the encoder G1 shown in FIG. 1, which results in a linear relationship between the output signal AW of the encoder G1 and the rotational angle w1 of the shaft 10 over a part or at most over the entire circumference of the shaft 10, an ellipsoid form of the track 18 of the encoder G1 can be provided, which is shown in FIG. 3. The occurrence of the ellipsoid form can be imagined in that, starting from a circle around the shaft 10 in the circumferential direction 12, the circle is fixed at one point of the shaft 10 and the part of the circle opposite by 180° is displaced in the longitudinal direction 14 of the shaft 10 by the predefined pitch h.

Figure 4:
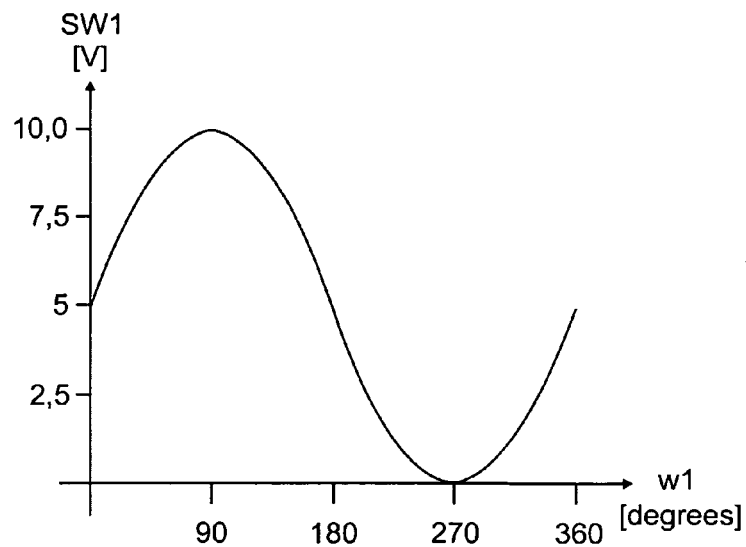
FIG. 4 shows a functional relationship between a rotational angle of the shaft and an output signal of the sensor shown in FIG. 3.

The track 18 of the encoder G1 implemented in ellipsoid form according to FIG. 3 results in a relationship between the sensor signal SW1 and the rotational angle w1 of the shaft 10 shown in FIG. 4, which runs in the form of a sine or cosine, a unique association of the sensor signal SW1 with the rotational angle w1 being provided for a half revolution of 0°-180° or 180°-360°. The following formula applies:

$$w1 = \arcsin\left(\frac{SW1}{h \cdot b} * \frac{360°}{2\pi}\right) \qquad (2)$$

where the variables w1, SW1, and b correspond to those from formula (1) and the pitch h here is the ellipsoid height in millimeters.

In the exemplary embodiment shown in FIG. 3, it is presumed that the wraparound of the shaft 10 is complete, so that a completely closed ellipsoid accordingly results. The track shown in FIG. 3 therefore has precisely one period per revolution of the shaft 10.

Figure 5:
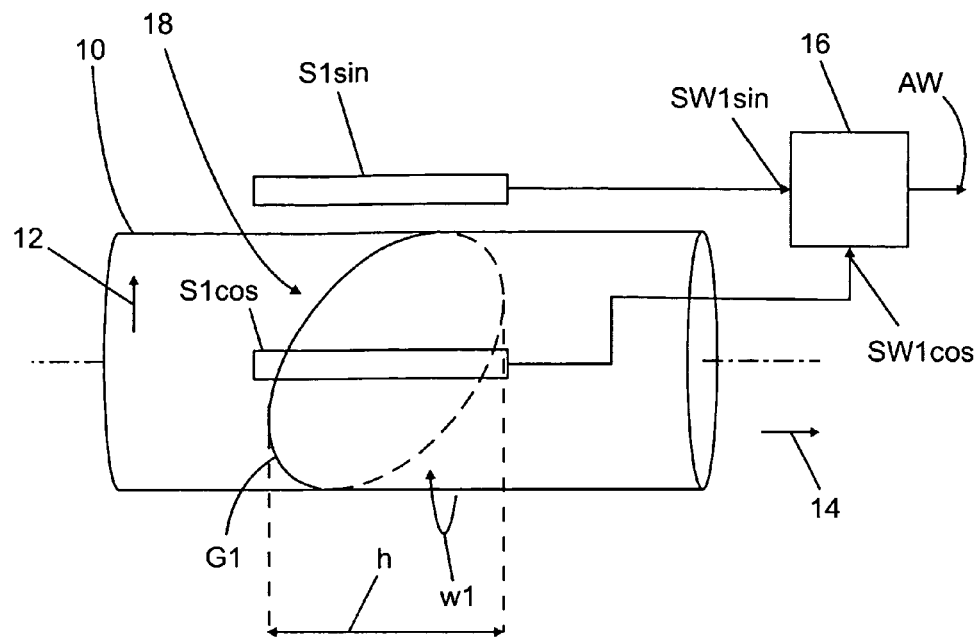
FIG. 5 shows a shaft, with which an encoder is associated, which is scanned by two sensors.
Figure 6:
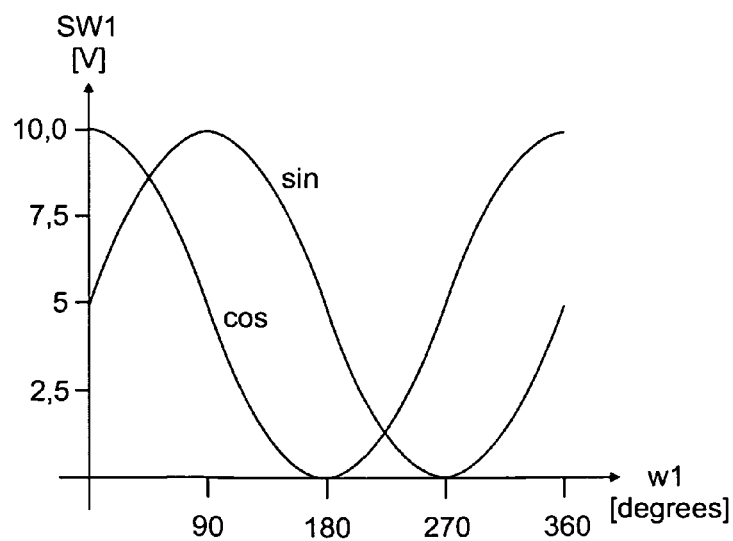
FIG. 6 shows functional relationships between a rotational angle of the shaft and output signals of the sensors shown in FIG. 5.

Firstly, to increase the robustness of the configuration, in particular with respect to interfering influences which act on the sensor signal SW1, instead of only one position sensor S1, a first sensor and a second sensor S1 sin, S1 cos can be provided, which are referred to hereafter as the first and second position sensors S1 sin, S1 cos. FIG. 5 is based on this case. The first position sensor S1 sin provides a sensor signal SW1 sin and the second position sensor S1 cos provides a sensor signal SW1 cos. The second position sensor S1 cos scans the same track 18 as the first position sensor S1 sin, but is situated in relation to the shaft in the circumferential direction 12 such that its sensor signal SW1 cos is phase-shifted by at least approximately 90° to the sensor signal SW1 sin of the first position sensor S1 sin. The resulting sensor signals SW1 sin, SW1 cos are shown in greater detail in FIG. 6.

In the signal-processing configuration 16, to which both sensor signals SW1 sin, SW1 cos are provided in this case, the arc tangent function of the two sensor signals SW1 sin, SW1 cos is calculated, which directly delivers the rotational angle w1 of the shaft 10 unambiguously in the range from 0°-360°. Because of the division of the two sensor signals SW1 sin, SW1 cos upon the ascertainment of the arc tangent function, the result is substantially independent of influences which act in the same direction on the amplitudes of the sensor signals SW1 sin, SW1 cos.

However, instead of one position sensor S1, a first position sensor and a second position sensor can also be provided in the exemplary embodiment according to FIG. 1 to increase the robustness of the configuration, in particular with respect to interfering influences which act on the sensor signal SW1. The sensor signal is then available redundantly, so that a plausibility check and/or a mean value calculation are possible, for example.

Figure 7:
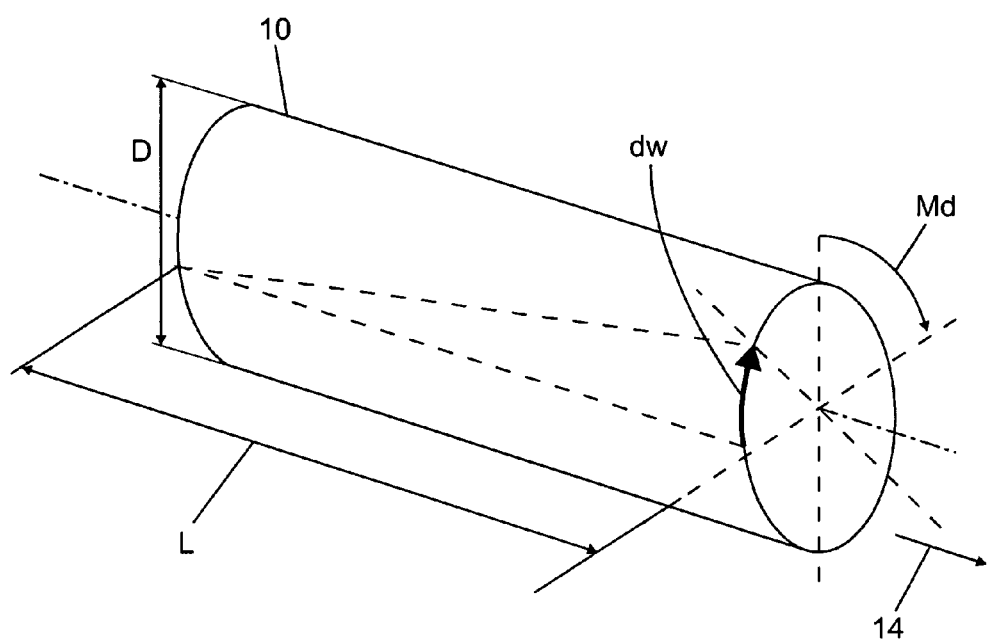
FIG. 7 shows a shaft on which an occurring torque results in a twist of the shaft.

FIG. 7 shows the shaft 10 or at least a section of the shaft 10 on which a torque Md acts, which results in torsion of the shaft 10. In relation to a predefined spacing L in the longitudinal direction 14 of the shaft 10, the twist angle dw of the shaft 10 is a function of the absolute value of the torque Md. In the range of elastic deformation, the twist angle dw in degrees is proportional to the product of torque Md in Nmm and the predefined spacing L in mm and is inversely proportional to the product of the modulus of shear G in N/mm², for example, 80,000 N/mm² in the case of steel, and the polar moment of inertia Ip. The polar moment of inertia Ip is in turn proportional to the product of π/32 and the fourth power of the shaft diameter D in mm. The following formulas apply:

$$dw = \left(\frac{Md}{G} * \frac{L}{Ip}\right) \text{ where} \qquad (3)$$

$$Ip = \frac{\pi}{32} * D^4 \qquad (4)$$

Figure 8:
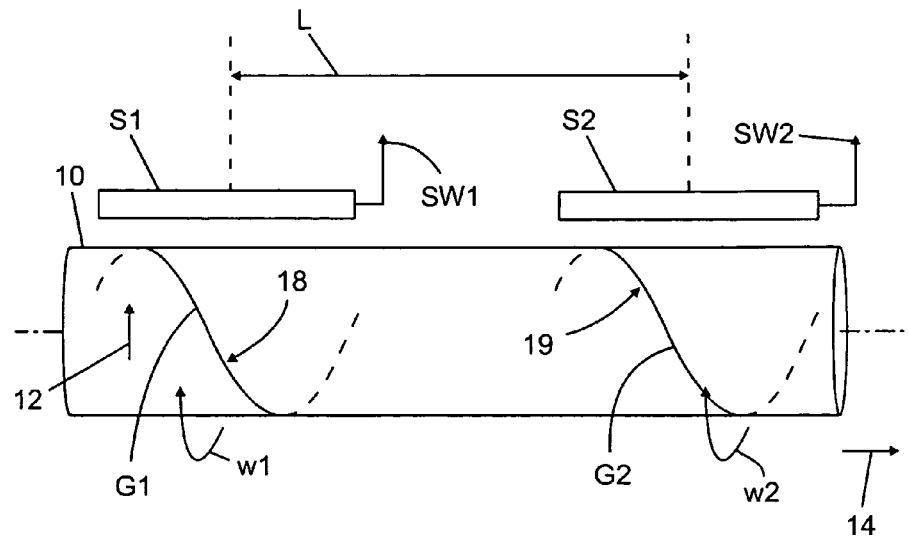
FIG. 8 shows a shaft, with which two encoders offset at a predefined spacing in relation to the shaft longitudinal direction are associated, each of which is scanned by a sensor.

FIG. 8 shows the shaft 10, with which a first and second encoder G1, G2 are associated, which are offset at the predefined spacing L in relation to the shaft longitudinal direction 14. The first encoder G1 is again scanned by the first position sensor S1 and the second encoder G2 is scanned by a second position encoder S2. The first encoder G1 is again to have a track according to FIG. 1, which winds in the form of a helix or spiral around the shaft 10 in the circumferential direction 12 of the shaft 10. In the exemplary embodiment shown, it is again assumed that the encoder G1 wraps around completely. However, the wraparound can also only extend over a part of the circumference of the shaft 10. This is also true for the second encoder G2 and the second position sensor S2.

The first position sensor S1 which scans the first encoder G1 is again an inductive sensor, whose sensor signal SW1 reflects the section of the track of the first encoder G1 closest to the first position sensor S1 in a position-sensitive manner. The first sensor signal SW1 is therefore again a measure for the rotational angle w1 of the shaft 10 in the area of the first encoder G1.

The second position sensor S2 which scans the second encoder G2 is also an inductive sensor, whose sensor signal SW2 reflects the section of the track of the second encoder G2 closest to the second position sensor S2 in a position-sensitive manner. The second sensor signal SW2 is therefore a measure for the rotational angle w2 of the shaft 10 in the area of the second encoder G 2.

In the exemplary embodiment according to FIG. 8, two or more first position sensors S1 can again be provided, which scan the first encoder G1. This is also true for the configuration relating to second encoder G2 and second position sensor S2.

The essential advantage of the configuration according to the invention shown in FIG. 8 is that because of the predefined spacing L between the two encoders G1, G2, a possibly occurring twist angle dw of the shaft 10 can be detected, which occurs between the spacing L of the two encoders G1, G2. As already described in connection with FIG. 7, the twist angle dw is a measure for the torque Md occurring on the shaft 10, which causes the twist.

Figure 9:
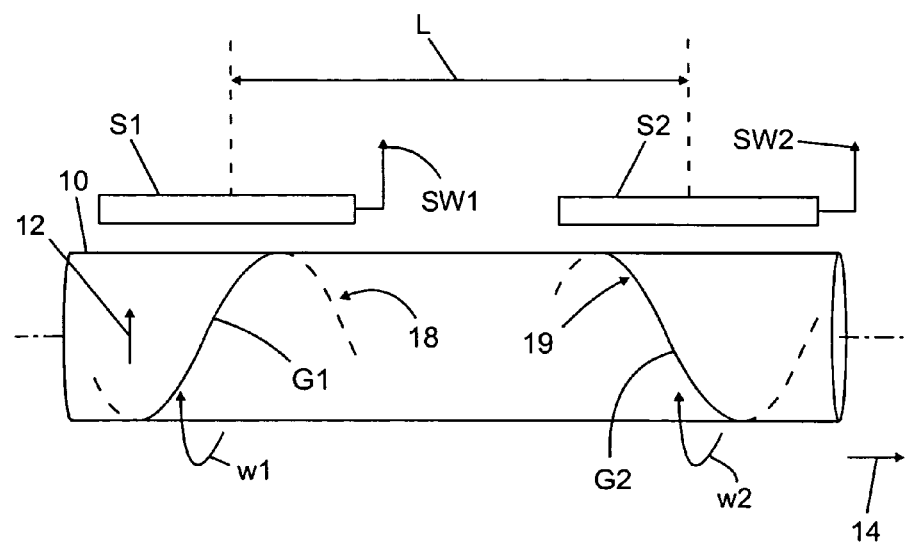
FIG. 9 shows a shaft, with which two encoders offset at a predefined spacing in relation to the shaft longitudinal direction are also associated, which are each scanned by a sensor, the tracks of the encoders being implemented alternatively.

In the exemplary embodiment shown in FIG. 8, the tracks 18, 19 of the two encoders G1, G2 run in the same direction around the shaft 10. FIG. 9 shows an exemplary embodiment in which the tracks 18, 19 of the two encoders G1, G2 run mirror-inverted or in opposite directions around the shaft 10. Using this measure, common mode influences on the two encoders G1, G2 and/or the two position sensors S1, S2 are compensated for.

Figure 10:
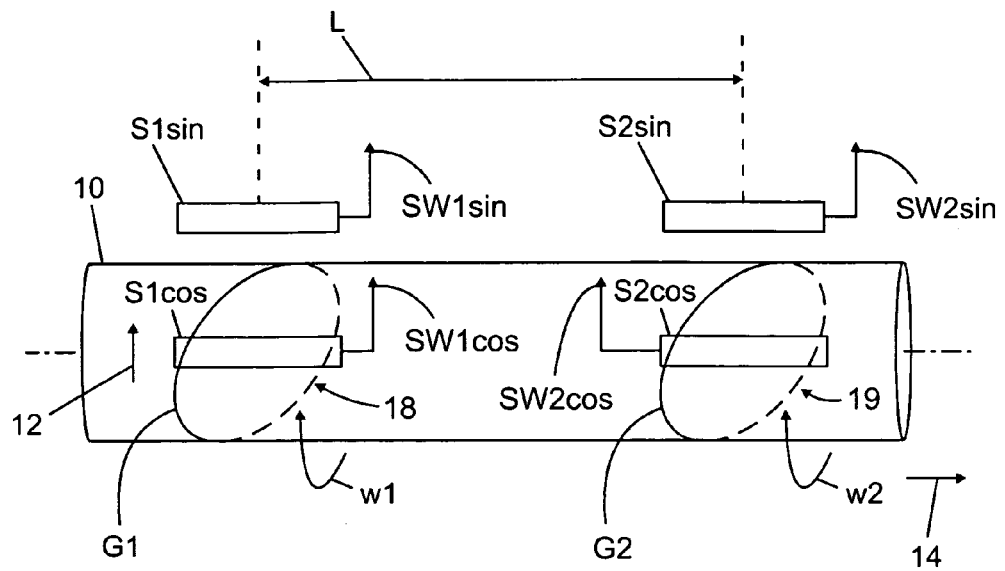
FIG. 10 shows a shaft, with which two encoders offset at a predefined spacing in relation to the shaft longitudinal direction are also associated, which are each scanned by two sensors.

FIG. 10 shows an exemplary embodiment for detecting the twist angle dw or the torque Md acting on the shaft 10, in which the tracks 18, 19 of the two encoders G1, G2 are implemented in the ellipsoid form according to FIG. 3, two position sensors S1 sin, S1 cos, S2 sin, S2 cos again preferably being associated with each encoder G1, G2.

Figure 11:
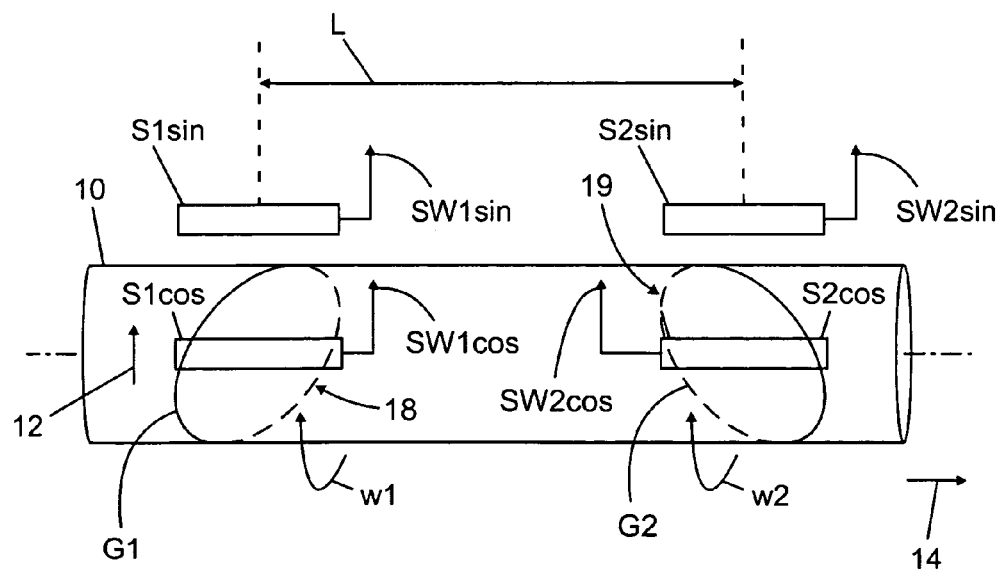
FIG. 11 shows a shaft, with which two encoders offset at a predefined spacing in relation to the shaft longitudinal direction are associated, which are each scanned by two sensors, the tracks of the encoders being implemented alternatively.

The tracks of the encoders G1, G2 are situated running in the same direction around the shaft 10 in FIG. 10, while in the exemplary embodiment according to FIG. 11, the tracks of the encoders G1, G2 are situated in opposite directions or mirror-inverted around the shaft 10, whereby common mode interference possibly acting on the configuration can again be to be compensated for and/or suppressed.

Figure 12:
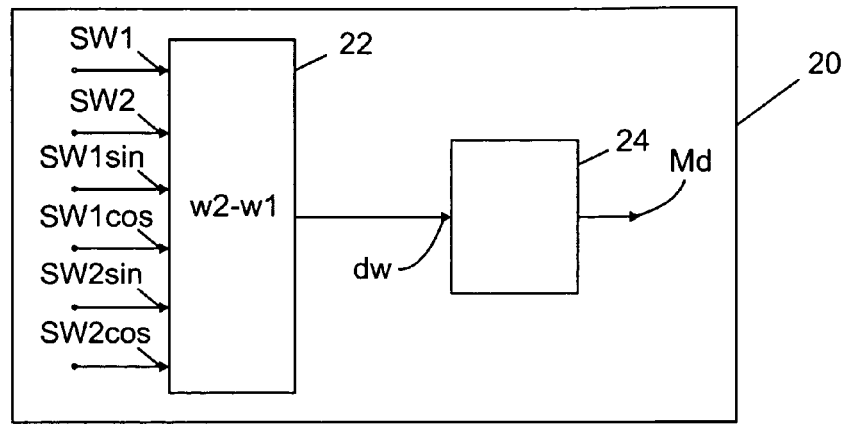
FIG. 12 shows a block diagram of a signal-processing configuration.

FIG. 12 shows a block diagram of another signal-processing configuration 20, which contains an angle difference ascertainment unit 22 and a torque ascertainment unit 24. The sensor signals SW1, SW2, SW1 sin, SW1 cos, SW2 sin, SW2 cos of the respective provided position sensors S1, S2, S1 sin, S1 cos, S2 sin, S2 cos are provided to the angle difference ascertainment unit 22. On the basis of the above-described functional relationship between the sensor signals SW1, SW2, SW1 sin, SW1 cos, SW2 sin, SW2 cos and the rotational angles w1, w2, the angle difference ascertainment unit 22 ascertains the twist angle dw of the shaft 10 in relation to the spacing L, which is provided to the torque ascertainment unit 24. On the basis of the also described functional relationship between the twist angle dw and the torque Md, the torque ascertainment unit 24 is capable of providing the torque Md as an output signal.

Figure 13:
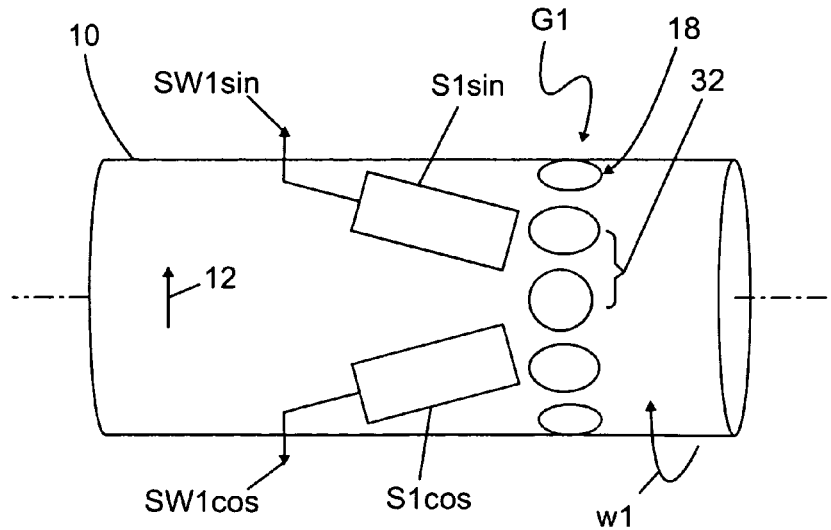
FIG. 13 shows a shaft, with which an encoder is associated, which is scanned by two track sensors.

FIG. 13 shows an exemplary embodiment in which the first encoder G1, which has the track 18, is again associated with the shaft 10. The track 18 runs in the circumferential direction 12 of the shaft 10, a pitch h of zero, i.e., no pitch h, being predefined in this exemplary embodiment. The track 18 contains a period 32, which preferably repeats identically multiple times in the circumferential direction 12. The track 18 is again scanned by the first sensor S1 sin, which is referred to hereafter as the spacing sensor S1 sin, which provides the sensor signal SW1 sin, which unambiguously reflects the rotational angle w1 of the shaft 10 in relation to a half period 32.

The first spacing sensor S1 sin is again implemented as an inductive sensor. For example, the sensor signal SW1 sin has an output voltage, as shown in FIG. 4, as a function of the position of a period 32, which corresponds to the sine of the rotational angle w1 within one of the possible multiple periods 32 of the track 18.

To increase the robustness of the configuration, in particular with respect to interfering influences which could act on the sensor signal SW1 sin, the second sensor S1 cos is again preferably provided, which is referred to hereafter as the second spacing sensor S1 cos, which scans the same period 32 of the track 18 as the first spacing sensor S1 sin, but is again situated such that its second sensor signal SW1 cos is phase-shifted by at least approximately 90° to the first sensor signal SW1 sin.

The period 32 of the track 18 is preferably implemented such that during the rotation of the shaft 10, at least approximately sinusoidal sensor signals SW1 sin, SW1 cos result, a phase shift by at least approximately 90° being predefined. In the signal-processing configuration 20, the arc tangent function of the two sensor signals SW1 sin, SW1 cos is again calculated here, which directly provides the rotational angle w1 of the shaft and within a period 32 of the track 18. Because of the division of the two sensor signals SW1 sin, SW1 cos upon the ascertainment of the arc tangent function, the result—as already similarly shown in the exemplary embodiment according to FIGS. 5 and 6—is independent of influences which act in common mode on the amplitudes of the sensor signals SW1 sin, SW1 cos.

Figure 14:
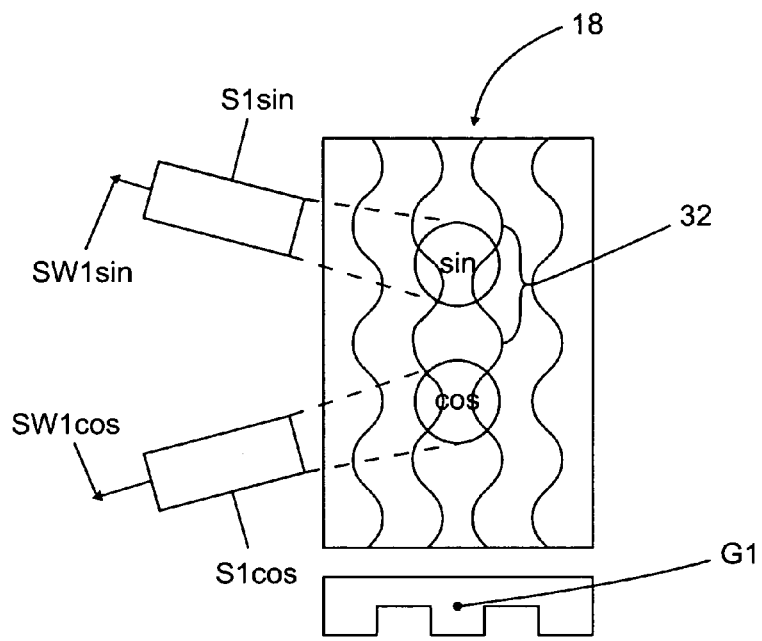
FIG. 14 shows an exemplary embodiment of a track of an encoder.

FIG. 14 shows an exemplary embodiment of the period 32 of the track 18. The encoder G1 is implemented as a web, for example, which is optionally implemented as a strip, which can thus be laid subsequently around the shaft 10. The period 32 is implemented as a web having sinusoidally modulated width. The extension of a period 32 in the circumferential direction 12 of the shaft 10 is indicated by the curly bracket. The period 32 is produced using two sinusoidal milled grooves, for example.

Figure 15:
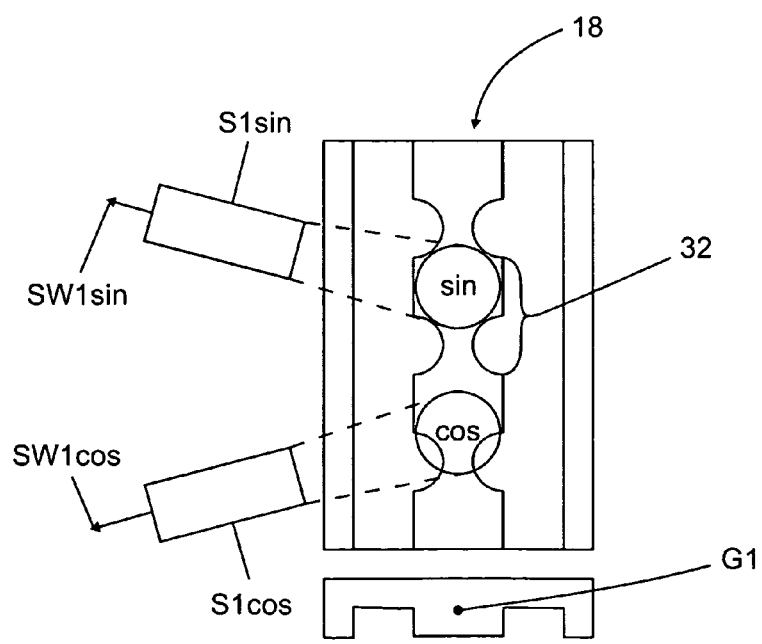
FIG. 15 shows a further exemplary embodiment of a track of an encoder.

FIG. 15 shows a further exemplary embodiment of the period 32. The period 32 is again implemented here, for example, as a web, but having only approximately sinusoidally modulated width. The extension of a period 32 in the circumferential direction 12 of the shaft 10 is again indicated by the curly bracket. The period 32 is produced, for example, using two linear milled grooves having lateral protrusions.

Figure 16:
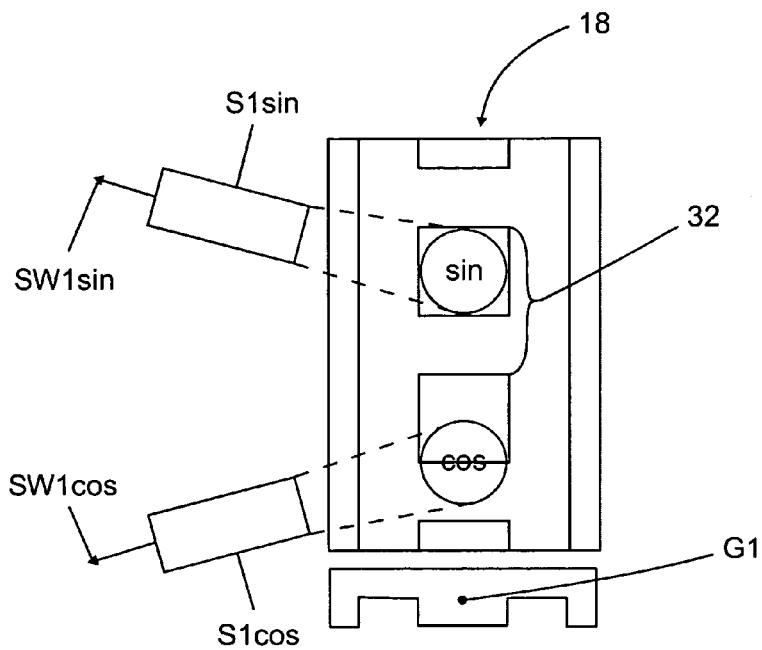
FIG. 16 shows another exemplary embodiment of a track of an encoder.

FIG. 16 shows another exemplary embodiment of the period 32. The period 32 is implemented here as a web having rectangular cams, for example. The extension of a period 32 in the circumferential direction 12 of the shaft 10 is again indicated by the curly bracket. The period 32 is produced using two linear milled grooves having connection grooves, for example.

Figure 17:
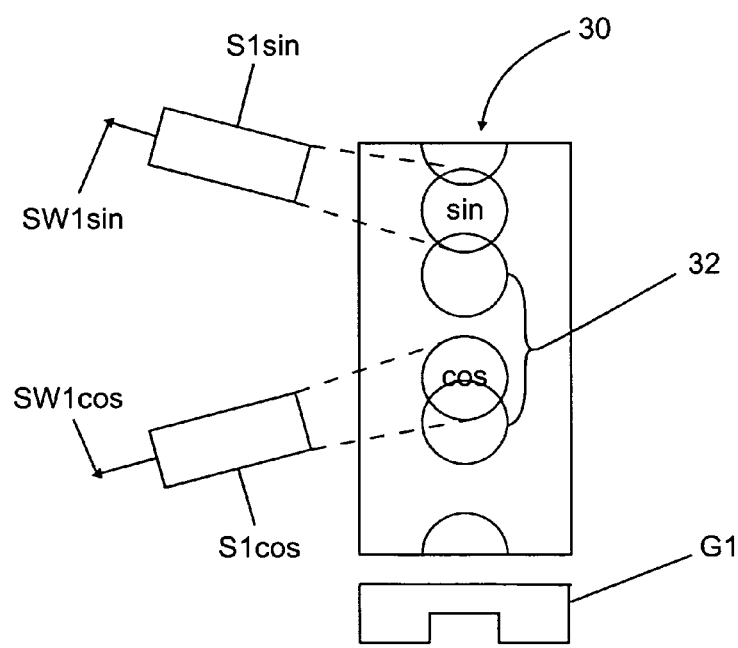
FIG. 17 shows an alternative exemplary embodiment of a track of an encoder.

FIG. 17 shows an alternative exemplary embodiment of the period 32. The period 32 is implemented here, for example, using boreholes or recesses. The extension of a period 32 in the circumferential direction 12 of the shaft 10 is again indicated by the curly bracket. The period 32 is produced using a row of pocket holes, for example.

Figure 18:
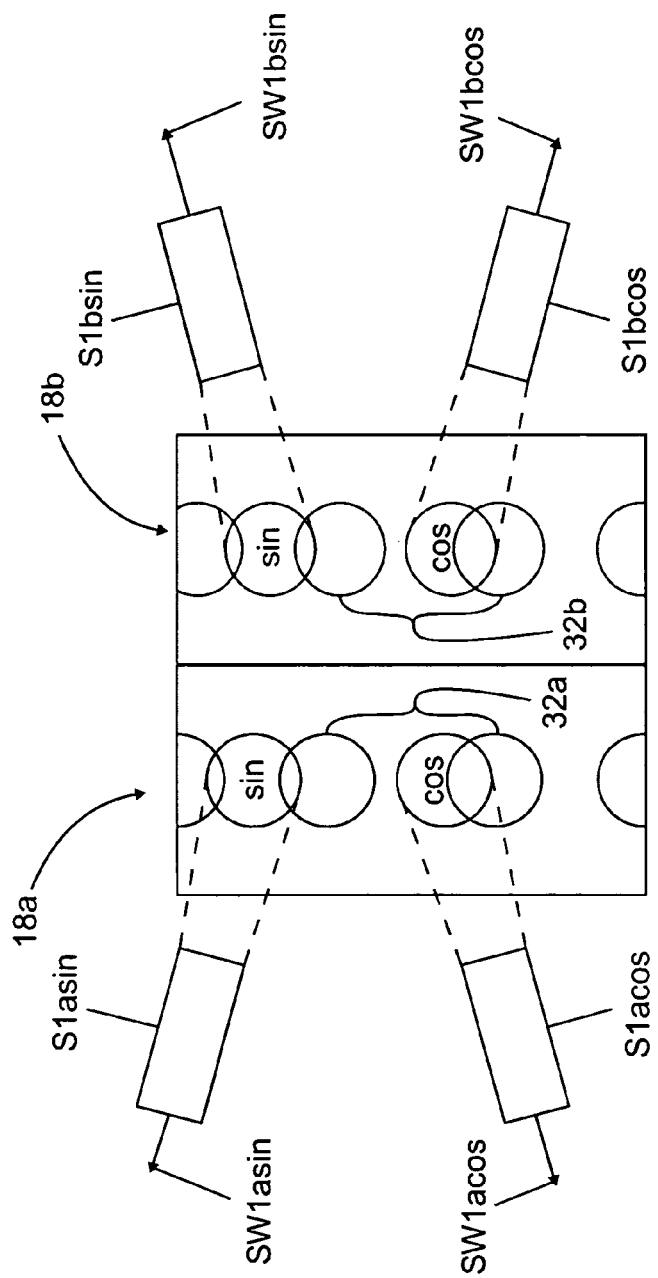
FIG. 18 shows an exemplary embodiment of an encoder having two tracks, which are each scanned by two track sensors.

As already mentioned, the encoder G1 according to FIG. 13 allows an unambiguous detection of the rotational angle w1 of the shaft 10 only within a single period 32 of the track 18. FIG. 18 shows an exemplary embodiment in which the encoder G1 has a second track 18b directly adjacent to the first track 18a. The first track 18a is scanned by a first track sensor S1a sin and a second track sensor S1a cos. The two track sensors S1a sin, S1a cos are again preferably situated such that during a scan of the period 32a of the first track 18a, their sensor signals SW1a sin, SW1a cos have a phase shift of at least approximately 90°.

The second track 18b is also scanned by a first track sensor S1b sin and a second track sensor S1b cos. The two track sensors S1b sin, S1b cos are again preferably situated such that during a scan of the period 32b of the second track 18b, their sensor signals SW1b sin, SW1b cos have a phase shift of at least approximately 90°.

It is essential for this purpose that the first track 18a has a number N greater than one of periods 32a, and the second track 18b also has a predefined number M of periods 32b, this number M deviating by a multiple of one, preferably by one, from the number N of the first track 18a. The two tracks 18a, 18b thus deliver two different rotational angles. This means that the rotational angles ascertained in each of the individual periods 32a, 32b has a specific angle difference, which is characteristic for each rotational position of the shaft 10 or for each pattern pair. A scan of a very specific period 32a, 32b can thus be concluded from the angle difference, so that the ambiguity upon twisting of the shaft 10 around multiple periods 32a, 32b can be eliminated and a high-resolution detection of the rotational angle w1 of the shaft 10 is possible over a part of the circumference or the entire circumference. For example, the first track 18a is used as the reference for ascertaining the rotational angle w1 of the shaft, which is normally the track which has the number N of repeating periods 32a which is higher by at least one.

According to a simpler embodiment of the encoder G1, only a single period 32 can also be provided. The extension of the period 32 in the circumferential direction 12 of the shaft 10 is to be measured such that the desired measuring range for the rotational angle w1 is achieved. This embodiment applies for all exemplary embodiments having the encoders situated in the circumferential direction 12 of the shaft 10 without pitch h.

Through the use of the first encoder G1 and the second encoder G2 according to the exemplary embodiments shown in FIGS. 13-18, which are associated with the predefined spacing L of the shaft 10, the torque Md occurring on the shaft 10 can again be ascertained on the basis of the difference calculation of the rotational angles w1, w2 in the above-described way. The configuration is shown in FIG. 19.

The first encoder G1 contains a first track 18a and a second track 18b. The first track 18a has a first period 32_1a extending in the circumferential direction 12 of the shaft 10 and the second track 18b has a second period 32_1b, optionally repeating in the circumferential direction 12 of the shaft 10. The first track 18a is scanned by the first track sensor S1a sin, which provides a first sensor signal SW1a sin, and by the second track sensor S1a cos, which provides a second sensor signal SW1a cos, and the second track 18b is scanned by a first track sensor S1b sin, which provides a first sensor signal SW1b sin, and by a second track sensor S1b cos, which provides a second sensor signal SW1b cos.

The second encoder G2 contains a first track 19a and a second track 19b. The first track 19a has a first period 32_2a, optionally repeating in the circumferential direction 12 of the shaft 10 and the second track 19b has a second period 32_2b, optionally repeating in the circumferential direction 12 of the shaft 10. The first track 19a is scanned by a first track sensor S2a sin which provides a first sensor signal SW2a sin, and by a second track sensor S2a cos, which provides a second sensor signal SW2a cos, and the second track 19b is scanned by a first track sensor S2b sin, which provides a first sensor signal SW2b sin, and by a second track sensor S2b cos, which provides a second sensor signal SW2b cos.

Figure 19:
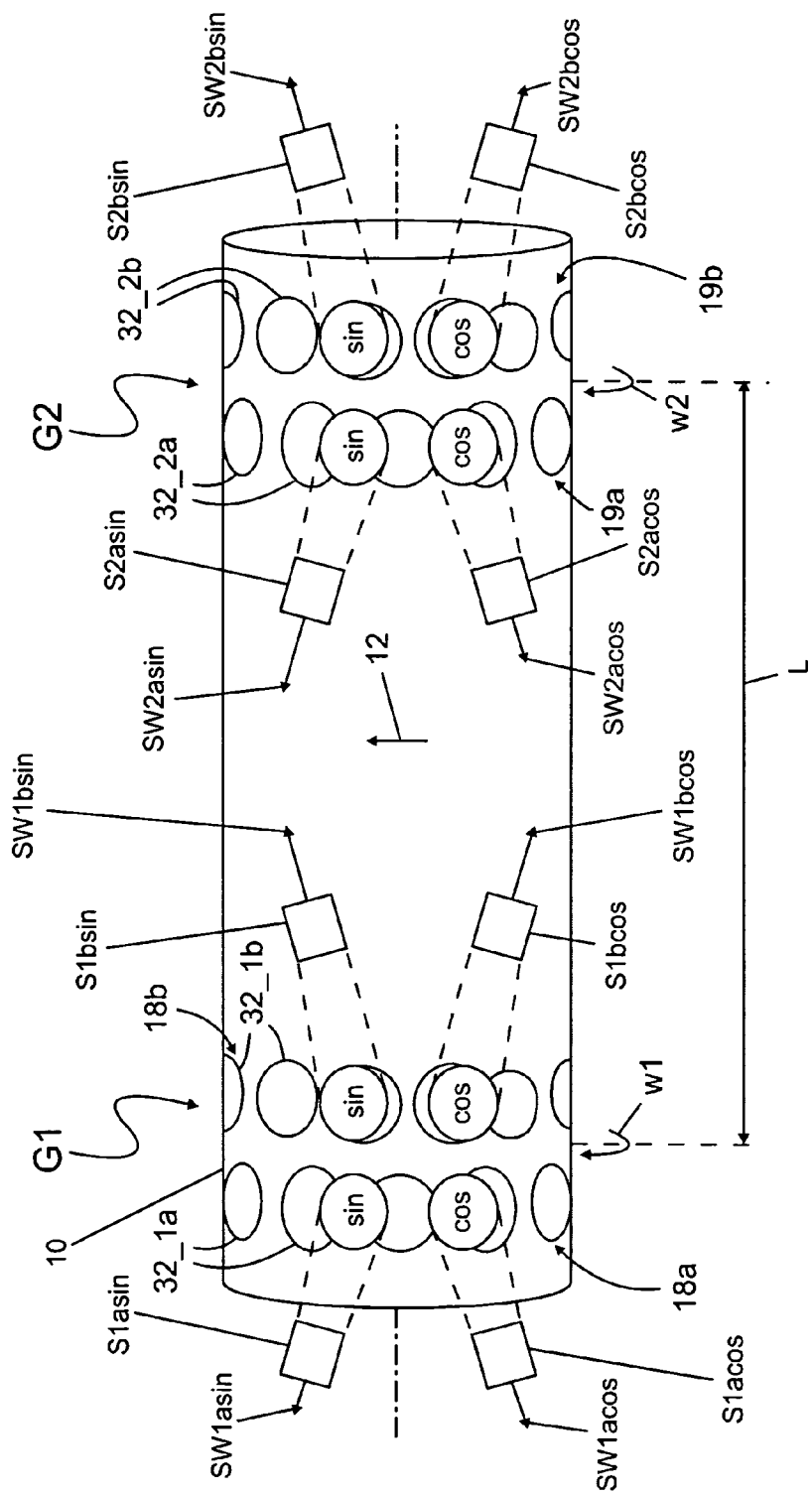
FIG. 19 shows a shaft with which two encoders offset at a predefined spacing in relation to the shaft longitudinal direction, each having two tracks, are again associated, which are each scanned by two track sensors.

FIG. 19 illustrates the concept that the first track 18a, 19a and the second track 18b, 19b of each encoder G1, G2 are to be situated directly adjacent. This is to express the concept that a possibly occurring twist angle between both tracks 18a, 18b; 19a, 19b is substantially less than the twist angle dw possibly occurring between the two encoders G1, G2 situated at the spacing L, on which the ascertainment of the torque Md occurring on the shaft 10 is based.

It is also possible here as a function of the expected torque Md or the expected rotational angles w1 w2 to provide the first encoder G1 and/or the second encoder G2 with only a single period 32_1a, 32_2a without repetition, so that because of the omission of the ambiguity in the encoders G1, G2, the second track 18b, 19b can also be dispensed with in each case.

What is claimed is:

1. A device for detecting a twist angle of a shaft and/or a torque occurring on the shaft, the device comprising:
    at least one first passive encoder associated with at least a part of the circumference of the shaft, influencing at least one first coil parameter, and having at least one first encoder track having at least one period per revolution of the shaft,
    at least one first inductive proximity sensor for scanning the at least one first passive encoder and providing a first rotational angle of the shaft within the period,
    at least one second passive encoder also associated with at least a part of the circumference of the shaft, influencing at least one second coil parameter, being provided at a predefined spacing to the at least one first passive encoder, and having at least one second encoder track having at least one period per revolution of the shaft,
    at least one second inductive proximity sensor for scanning the at least one second passive encoder and also providing a second sensor signal reflecting at least one measure for a second rotational angle of the shaft within the period, and
    a difference ascertainment unit ascertaining and providing the twist angle of the shaft as an angle difference of the first rotational angles detected by the at least one first inductive proximity sensors and the second rotational angle detected by the at least one second inductive proximity sensor;
    wherein the at least one first encoder track extends without pitch only in the circumferential direction of the shaft and contains a plurality of repeating periods;
    wherein the at least one first inductive proximity sensor comprises a first first inductive proximity sensor and a second first inductive proximity sensor;
    wherein the first first inductive proximity sensor and the second first inductive proximity sensor are associated with the at least one first encoder track;
    wherein the first first inductive proximity sensor and the second first inductive proximity sensor are positioned in relation to the periods of the at least one first encoder track such that the first first inductive proximity sensor provides a first first sensor signal phase-shifted by at least approximately 90° in relation to a second first sensor signal provided by the second first inductive proximity sensor;
    wherein the at least one first encoder track comprises a first first encoder track and a second first encoder track directly adjacent to the first first encoder track;
    wherein the first first encoder track contains a first predefined number greater than one of repeating periods;

wherein the second first encoder track has a second predefined number of repeating periods; and
wherein the second predefined number deviates by at least one from the first predefined number.

2. The device according to claim 1, wherein the at least one first encoder track is wound mirror-inverted in relation to the at least one second encoder track with respect to the longitudinal direction of the shaft.

3. The device according to claim 1, wherein the period of the at least one track of the first encoder track and/or of the at least one second encoder track is implemented as a web or groove of modulated width and/or height.

4. The device according to claim 1, wherein the period of the at least one first encoder track and/or of the at least one second encoder track is implemented as a web having sinusoidally modulated width.

5. The device according to claim 1, wherein the period of the at least one first encoder track and the period of the at least one second encoder track is implemented as a web having at least sectionally sinusoidally modulated width.

6. The device according to claim 1, wherein the period of the at least one second encoder track and/or of the at least one second encoder track is implemented as a cam.

7. The device according to claim 1, wherein the period of the at least one first encoder track and/or of the at least one second encoder track is implemented as a recess.

8. The device according to claim 1, wherein the device further comprises a third first inductive proximity sensor and a fourth first inductive proximity sensor each associated with the second first encoder track and positioned in relation to the period of the second first encoder track such that the third first inductive proximity sensor provides a third first sensor signal which is phase-shifted by at least approximately 90 ° in relation to a fourth first sensor signal provided by the fourth first inductive proximity sensor.

9. A shaft of a transmission comprising a device for detecting a twist angle of the shaft and/or a torque occurring on the shaft, the device comprising:
at least one first passive encoder associated with at least a part of the circumference of the shaft, influencing at least one first coil parameter, and having at least one first encoder track having at least one period per revolution of the shaft,
at least one first inductive proximity sensor for scanning the at least one first passive encoder and providing a first sensor signal reflecting at least one measure for a first rotational angle of the shaft within the period,
at least one second passive encoder also associated with at least a part of the circumference of the shaft, influencing at least one second coil parameter, being provided at a predefined spacing to the at least one first passive encoder, and having at least one second encoder track having at least one period per revolution of the shaft,
at least one second inductive proximity sensor for scanning the at least one second passive encoder and also providing a second sensor signal reflecting at least one measure for a second rotational angle of the shaft within the period, and
a difference ascertainment unit ascertaining and providing the twist angle of the shaft as an angle difference of the first rotational angle detected by the at least one first inductive proximity sensor and the second rotational angle detected by the at least one second inductive proximity sensor;
wherein the at least one first encoder track extends without pitch only in the circumferential direction of the shaft and contains a plurality of repeating periods;

wherein the at least one first inductive proximity sensor comprises a first first inductive proximity sensor and a second first inductive proximity sensor;
wherein the first first inductive proximity sensor and the second first inductive proximity sensor are associated with the at least one first encode track;
wherein the first first inductive proximity sensor and the second first inductive proximity sensor are positioned in relation to the periods of the at least one first encoder track such that the first first inductive proximity sensor provides a first first sensor signal phase-shifted by at least approximately 90 ° in relation to a second first sensor signal provided by the second first inductive proximity sensor;
wherein the at least one first encoder track comprises a first first encoder track and a second first encoder track directly adjacent to the first first encoder track;
wherein the first first encoder track contains a first predefined number greater than one of repeating periods;
wherein the second first encoder track has a second predefined number of repeating periods; and
wherein the second predefined number deviates by at least one from the first predefined number.

10. A method for detecting a torque of a shaft, the method comprising steps of:
providing the shaft and a device, the device comprising:
at least one first passive encoder associated with at least a part of a circumference of the shaft, influencing at least one first coil parameter, and having at least one first encoder track having at least one period per revolution of the shaft, the at least one first encoder track extending without pitch only in the circumferential direction of the shaft and containing a plurality of repeating periods,
a first first inductive proximity sensor and a second first inductive proximity sensor for scanning the at least one first passive encoder and configured to provide a first first sensor signal and a second first sensor signal, respectively, reflecting at least one measure for a first rotational angle of the shaft within the period, the first first inductive proximity sensor and the second first inductive proximity sensor each being associated with the at least one first encoder track, and the first first inductive proximity sensor and the second first inductive proximity sensor being positioned in relation to the periods of the at least one first encoder track such that the first first sensor signal is phase-shifted by at least approximately 90 ° in relation to the second first sensor signal,
at least one second passive encoder also associated with at least a part of the circumference of the shaft, influencing at least one second coil parameter, being provided at a predetermined spacing to the at least one first passive encoder, and having at least one second encoder track having at least one period per revolution of the shaft,
at least one second inductive proximity sensor for scanning the at least one second passive encoder and configured to provide a second sensor signal reflecting at least one measure for a second rotational angle of the shaft within the period, and
a difference ascertainment unit configured to receive the first first sensor signal, the second first sensor signal, and the second sensor signal and to determine and provide a twist angle of the shaft based on the first first sensor signal, the second first sensor signal, and the second sensor signal, wherein the at least one first encoder track comprises a first first encoder track and a second first encoder track directly adjacent to the first first encoder track;

wherein the first first encoder track contains a first predefined number greater than one of repeating periods;

wherein the second first encoder track has a second predefined number of repeating periods; and wherein the second predefined number deviates by at least one from the first predefined number;

rotating the shaft;

scanning via the first first inductive proximity sensor the at least one first passive encoder during the rotating of the shaft;

scanning via the second first inductive proximity sensor the at least one first passive encoder during the rotating of the shaft;

generating via the first first inductive proximity sensor a first first sensor signal based on the scanning via the first first inductive proximity sensor;

generating via the second first inductive proximity sensor a second first sensor signal based on the scanning via the second first inductive proximity sensor;

scanning via the second inductive proximity sensor the at least one second passive encoder during the rotating of the shaft;

generating via the second inductive proximity sensor a second sensor signal based on the scanning via the second inductive proximity sensor;

transmitting the first first sensor signal, the second first sensor signal, and the second sensor signal to the difference ascertainment unit;

determining via the difference ascertainment unit a first rotational angle of the shaft within the period via dividing and entering into an arc tangent function the first first sensor signal and the second first sensor signal, determining via the difference ascertainment unit a second rotational angle from the second sensor signal; and determining via the difference ascertainment unit the twist angle of the shaft as an angle difference between the first rotational angle and the second rotational angle.

11. A method for detecting a torque of a shaft, the method comprising steps of:

providing the shaft and a device, the device comprising:

at least one first passive encoder associated with at least a part of a circumference of the shaft, influencing at least one first coil parameter, and having at least one first encoder track having at least one period per revolution of the shaft, the at least one first encoder track extending without pitch only in the circumferential direction of the shaft and containing a plurality of repeating periods, the at least one first encoder track comprising a first first encoder track and a second first encoder track directly adjacent to the first first encoder track, the first first encoder track containing a first predefined number greater than one of repeating periods, the second first encoder track having a second predefined number of repeating periods, and the second predefined number deviating by at least one from the first predefined number, a first first inductive proximity sensor, a second first inductive proximity sensor, a third first inductive proximity sensor, and a fourth first inductive proximity sensor for scanning the at least one first passive encoder and configured to provide a first first sensor signal, a second first sensor signal, a third first sensor signal, and a fourth first fourth sensor signal, respectively, reflecting at least one measure for a first rotational angle of the shaft within the period, the first first inductive proximity sensor and the second first proximity inductive sensor each being associated with the first first encoder track, the third first inductive proximity sensor and the fourth first inductive proximity sensor each being associated with the second first encoder track, the first first inductive proximity sensor and the second first inductive proximity sensor being positioned in relation to the periods of the first first encoder track such that the first first sensor signal is phase-shifted by at least approximately 90° in relation to the second first sensor signal, the third first inductive proximity sensor and the fourth first inductive proximity sensor being positioned in relation to the periods of the second first encoder track such that the third first sensor signal is phase-shifted by at least approximately 90° in relation to the fourth first sensor signal, at least one second passive encoder also associated with at least a part of the circumference of the shaft, influencing at least one second coil parameter, being provided at a predetermined spacing to the at least one first passive encoder, and having at least one second encoder track having at least one period per revolution of the shaft, at least one second inductive proximity sensor for scanning the at least one second passive encoder and configured to provide a second sensor signal reflecting at least one measure for a second rotational angle of the shaft within the period, and a difference ascertainment unit configured to receive the first first sensor signal, the second first sensor signal, and the second sensor signal and to determine and provide a twist angle of the shaft based on the first first sensor signal, the second first sensor signal, and the second sensor signal;

rotating the shaft;

scanning via the first first inductive proximity sensor the at least one first passive encoder during the rotating of the shaft;

scanning via the second first inductive proximity sensor the at least one first passive encoder during the rotating of the shaft;

scanning via the third first inductive proximity sensor the at least one first passive encoder during the rotating of the shaft;

scanning via the fourth first inductive proximity sensor the at least one first passive encoder during the rotating of the shaft;

generating via the first first inductive proximity sensor a first first sensor signal based on the scanning via the first first inductive proximity sensor;

generating via the second first inductive proximity sensor a second first sensor signal based on the scanning via the second first inductive proximity sensor;

generating via the third first third inductive proximity sensor a third first third sensor signal based on the scanning via the third first inductive proximity sensor;

generating via the fourth first inductive proximity sensor a fourth first sensor signal based on the scanning via the fourth first inductive proximity sensor;

scanning via the second inductive proximity sensor the at least one second passive encoder during the rotating of the shaft;

generating via the second inductive proximity sensor a second sensor signal based on the scanning via the second inductive proximity sensor;

transmitting the first first sensor signal, the second first sensor signal, the third first sensor signal, the fourth first sensor signal, and the second sensor signal to the difference ascertainment unit;

identifying a period of the at least one first encoder track via a comparison via the difference ascertainment unit of the first first sensor signal, the second first sensor signal, the third first sensor signal, and the fourth first sensor signal;

determining via the difference ascertainment unit a first rotational angle of the shaft within the period via dividing and entering into an arc tangent function the first first sensor signal, the second first sensor signal, the third first sensor signal, and the fourth first sensor signal, determining via the difference ascertainment unit a second rotational angle from the second sensor signal; and determining via the difference ascertainment unit the twist angle of the shaft as an angle difference between the first rotational angle and the second rotational angle.

12. A method for detecting a torque of a shaft, the method comprising steps of:
providing the shaft and a device, the device comprising:
at least one first passive encoder associated with at least a part of a circumference of the shaft, influencing at least one first coil parameter, and having at least one first encoder track having at least one period per revolution of the shaft,
at least one first inductive proximity sensor for scanning the at least one first passive encoder and configured to provide a first sensor signal reflecting at least one measure for a first rotational angle of the shaft within the period,
at least one second passive encoder also associated with at least a part of the circumference of the shaft, influencing at least one second coil parameter, being provided at a predetermined spacing to the at least one first passive encoder, and having at least one second encoder track having at least one period per revolution of the shaft,
at least one second inductive proximity sensor for scanning the at least one second passive encoder and configured to provide a second sensor signal reflecting at least one measure for a second rotational angle of the shaft within the period, and
a difference ascertainment unit configured to receive the first sensor signal and the second sensor signal and to determine and provide a twist angle of the shaft based on the first sensor signal and the second sensor signal;
wherein the at least one first encoder track extends without pitch only in the circumferential direction of the shaft and contains a plurality of repeating periods;
wherein the at least one first inductive proximity sensor comprises a first first inductive proximity sensor and a second first inductive proximity sensor;
wherein the first first inductive proximity sensor and the second first inductive proximity sensor are associated with the at least one first encoder track;
wherein the first first inductive proximity sensor and the second first inductive proximity sensor are positioned in relation to the periods of the at least one first encoder track such that the first first inductive proximity sensor provides a first first sensor signal phase-shifted by at least approximately 90 °0 in relation to a second first sensor signal provided by the second first inductive proximity sensor;

wherein the at least one first encoder track comprises a first first encoder track and a second first encoder track directly adjacent to the first first encoder track;
wherein the first first encoder track contains a first predefined number greater than one of repeating periods;
wherein the second first encoder track has a second predefined number of repeating periods; and
wherein the second predefined number deviates by at least one from the first predefined number;
rotating the shaft;
scanning via the at least one first inductive proximity sensor the at least one first passive encoder during the rotating of the shaft;
generating via the at least one first inductive proximity sensor at least one first sensor signal based on the scanning via the at least one first inductive proximity sensor;
scanning via the at least one second inductive proximity sensor the at least one second passive encoder during the rotating of the shaft;
generating via the at least one second inductive proximity sensor a second sensor signal based on the scanning via the at least one second inductive proximity sensor;
transmitting the at least one first sensor signal and the second sensor signal to the difference ascertainment unit;
determining via the difference ascertainment unit a first rotational angle from the at least one first sensor signal, a second rotational angle from the second sensor signal, and the twist angle of the shaft as an angle difference between the first rotational angle and the second rotational angle, and
determining via the difference ascertainment unit and via the twist angle of the shaft the torque acting on the shaft.

13. A non-transitory machine readable storage medium having stored thereon a computer program for inserting into a computer to cause the computer to execute a method for analyzing a shaft, the method comprising steps of:
scanning via a first first inductive proximity sensor at least one first passive encoder during a rotating of a shaft, the at least one first passive encoder being associated with at least a part of a circumference of the shaft and having at least one first encoder track having at least one period per revolution of the shaft, the at least one first encoder track extending without pitch only in the circumferential direction of the shaft and containing a plurality of repeating periods, the first first inductive proximity sensor being associated with the at least one first encoder track;
scanning via a second first inductive proximity sensor the at least one first passive encoder during the rotating of the shaft, the second first inductive proximity sensor being associated with the at least one first encoder track and being positioned in relation to the periods of the at least one first encoder track phase-shifted by at least approximately 90 ° in relation to the first first inductive proximity sensor;
generating via the first first inductive proximity sensor a first first sensor signal based on the scanning via the first first inductive proximity sensor;
generating via the second first inductive proximity sensor a second first sensor signal based on the scanning via the second first inductive proximity sensor;
scanning via a second inductive proximity sensor at least one second passive encoder during the rotating of the shaft, the at least one second passive encoder being associated with at least a part of the circumference of the shaft;

generating via the second inductive proximity sensor a second sensor signal based on the scanning via the second inductive proximity sensor;

transmitting the first first sensor signal, the second first sensor signal, and the second sensor signal to the computer;

determining via the computer a first rotational angle of the shaft within the period via dividing and entering into an arc tangent function the first first sensor signal and the second first sensor signal, determining via the computer a second rotational angle from the second sensor signal; and determining via the computer a twist angle of the shaft as an angle difference between the first rotational angle and the second rotational angle;

wherein the at least one first encoder track comprises a first first encoder track and a second first encoder track directly adjacent to the first first encoder track;

wherein the first first encoder track contains a first predefined number greater than one of repeating periods;

wherein the second first encoder track has a second predefined number of repeating periods; and wherein the second predefined number deviates by at least one from the first predefined number.

* * * * *

UNITED STATES PATENT AND TRADEMARK OFFICE
CERTIFICATE OF CORRECTION

| | | |
|---|---|---|
| PATENT NO. | : 9,026,378 B2 | Page 1 of 1 |
| APPLICATION NO. | : 13/136817 | |
| DATED | : May 5, 2015 | |
| INVENTOR(S) | : Fericean et al. | |

It is certified that error appears in the above-identified patent and that said Letters Patent is hereby corrected as shown below:

In the Claims

Column 12, line 28 (Line 10 of Claim 1), before "rotational" please insert:

--sensor signal reflecting at least one measure for a first--.

In Column 13, line 10 (Line 2 of Claim 3) after "at least one" delete: "track of the".

In Column 13, line 22 (Line 2 of Claim 6) please change "second" to: --first--.

In Column 14, line 6 (Line 38 of Claim 9) please change "encode" to: --encoder--.

In Column 17, line 65 (Line 44 of Claim 12) please change "90 °0" to correctly read: --90°--.

Signed and Sealed this
Eighteenth Day of August, 2015

Michelle K. Lee
*Director of the United States Patent and Trademark Office*